United States Patent [19]
Goodale

[11] Patent Number: 5,625,976
[45] Date of Patent: May 6, 1997

[54] FLY LINES

[75] Inventor: Robert H. Goodale, Boulder, Colo.

[73] Assignee: Flow Tek, Inc., Boulder, Colo.

[21] Appl. No.: 251,244

[22] Filed: May 31, 1994

[51] Int. Cl.$^6$ ............................................... A01K 91/00
[52] U.S. Cl. ............................ 43/44.98; 57/258; 428/395
[58] Field of Search ............................... 43/44.98; 87/1, 87/8, 11; 57/206, 250, 251, 258; 428/383, 395

[56] References Cited

U.S. PATENT DOCUMENTS

| | | |
|---|---|---|
| 1,602,312 | 10/1926 | Qurin . |
| 2,164,296 | 6/1939 | Wilcox . |
| 3,043,045 | 7/1962 | Martuch . |
| 3,063,189 | 11/1962 | Keller ................................. 43/44.98 |
| 3,334,436 | 8/1967 | Cole, Jr. . |
| 3,435,552 | 4/1969 | Caldwell . |
| 3,486,266 | 12/1969 | Richardson et al. . |
| 3,512,294 | 5/1970 | Howald . |
| 3,748,168 | 7/1973 | Schmidt ................................ 43/44.98 |
| 3,830,009 | 8/1974 | Collingbourne . |
| 3,914,480 | 10/1975 | Lang ................................ 43/44.98 |
| 4,048,744 | 9/1977 | Chandler . |
| 4,276,908 | 7/1981 | Horne . |
| 4,321,854 | 3/1982 | Foote et al. . |
| 4,386,132 | 5/1983 | Dille et al. . |
| 4,550,938 | 11/1985 | Nakanishi et al. . |
| 4,584,240 | 4/1986 | Herbert ................................ 43/44.98 |
| 4,606,144 | 8/1986 | Saski ................................ 43/44.98 |
| 5,207,732 | 5/1993 | Stark ................................ 43/44.98 |
| 5,296,292 | 3/1994 | Butters ................................ 43/44.98 |
| 5,374,600 | 12/1994 | Hozumi ................................ 502/402 |

FOREIGN PATENT DOCUMENTS 1369256  10/1974  United Kingdom ................ 43/44.98

OTHER PUBLICATIONS

Fly Lines; A.J. Hand; Tackle Guide '88; Mar., 1988, pp. 40–43.

Primary Examiner—Kurt Rowan
Assistant Examiner—James Miner
Attorney, Agent, or Firm—Harold A. Burdick

[57] ABSTRACT

Improved fishing lines, and specifically fly lines, and methods of manufacture and use thereof are disclosed. The line includes a core line portion and a coating portion, the coating including a copolymer of olefin and acrylic material, the olefin preferably being ethylene. The lines provided include a clear floating fly line having a nylon core and ethylene acrylic acid copolymer coating.

17 Claims, 2 Drawing Sheets

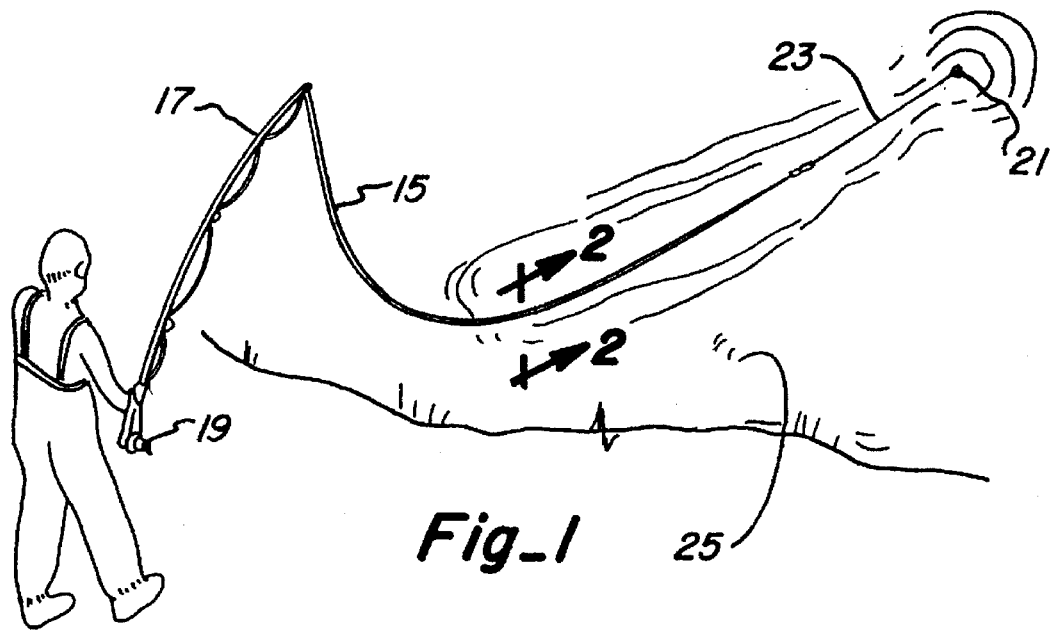
Fig_1
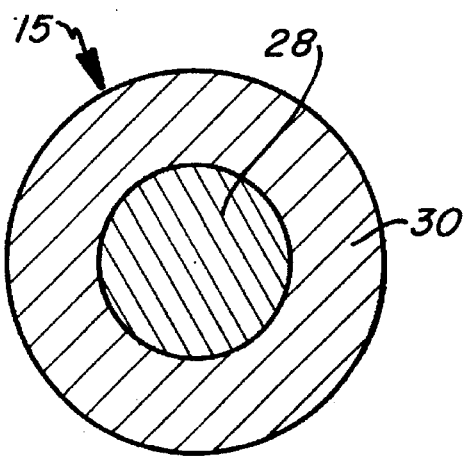
Fig_2
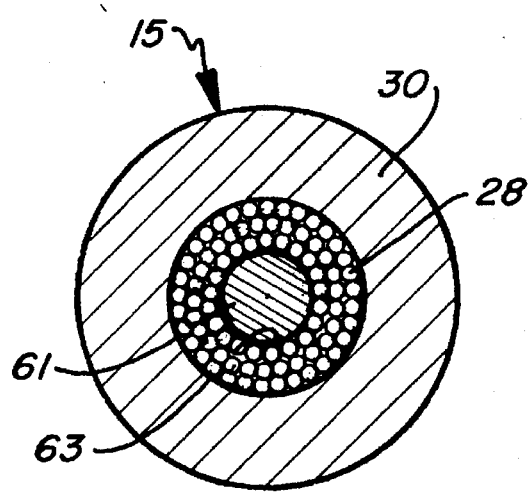
Fig_5

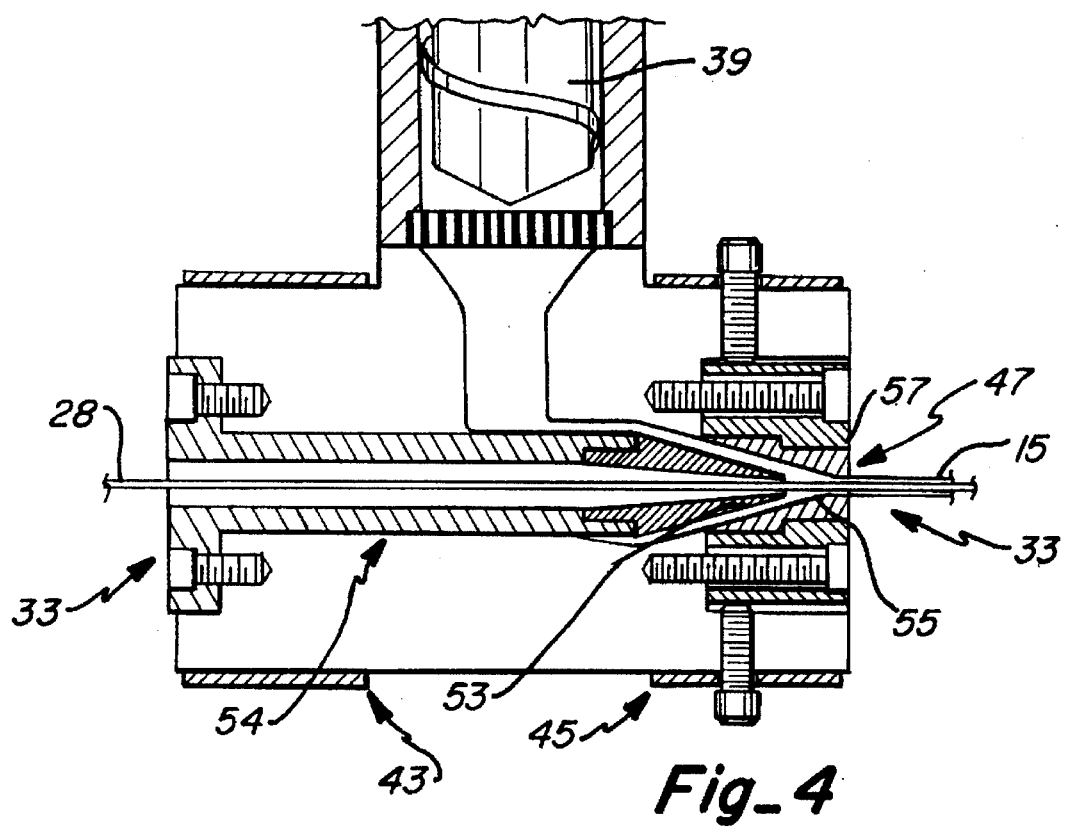
*Fig_4*
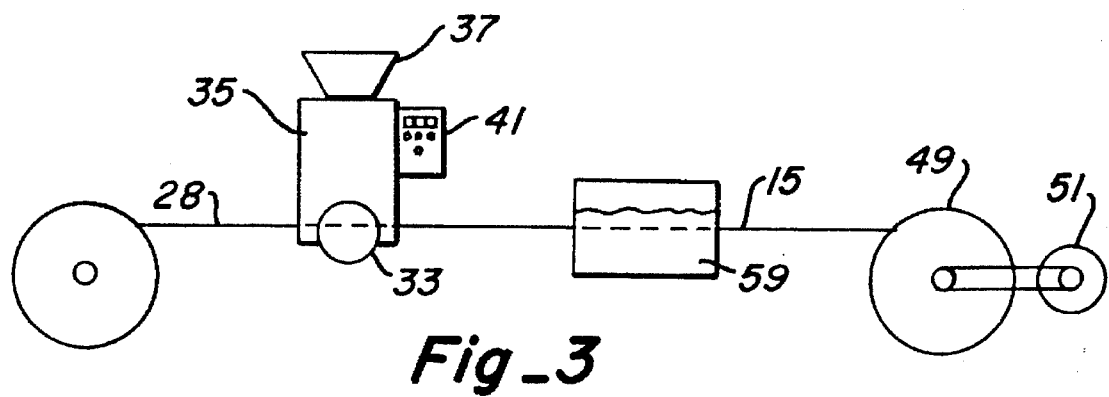
*Fig_3*

FLY LINES

FIELD OF THE INVENTION

This invention is related to fishing lines, and, more particularly, relates to fly fishing lines and methods for manufacture and use.

BACKGROUND OF THE INVENTION

Hydrophobic synthetic materials are known to be well adapted as fishing line, netting and the like, and, more particularly, composite lines made from such materials have been heretofore suggested and/or utilized for buoyant fly fishing lines.

For fly fishing (or casting), buoyant lines are often utilized. Such lines must have a specific gravity of less that about 1.15 or the surface tension of a still body of water will not be sufficient to keep the line afloat. However, since both the end of the leader and the fly (or lure) attached to the line are light weight, substantially all of the mass required for propelling, or casting, the fly to a desired position on the water is necessarily in the fly line itself. Moreover, while sufficient mass is required, bulk (cross-sectional size) of the line is desirably minimized to avoid undue wind resistance when casting.

Buoyant composite lines heretofore known and/or utilized have included lines having a braided nylon filament core with a vinyl plastisol coating, with the coating having microspheroids blended thereinto to promote buoyancy. Lines having a core made of the fiber known as "Kevlar" with a polyester urethane coating which is foamed to provide a multiplicity of air pockets to promote buoyancy have also been illustrated (see, for example, U.S. Pat. No. 3,043,045 and the article by A. J. Hand appearing in the March 1988 issue of Rod and Reel).

Floating fly lines such as those heretofore known have always exhibited, because of the materials and/or methods utilized in their manufacture, at least some degree of opaqueness, transparent or substantially transparent floating fly lines being thus unknown.

From the foregoing, it is apparent that a fly fishing line having a specific gravity which is low enough so that the line remains buoyant and lands consistently lightly on the surface of the water, while yet providing sufficient mass to maintain desired casting characteristics and cast distance, is in demand. Such a line preferably optimizes air resistance characteristics during casting by reducing line bulk, is durable and less subject to hardening and cracking over time (due, for example, to migration of plasticizers from the line coating material), and is substantially free of abrasive surface characteristics. In many uses, a substantially clear, or transparent, floating fly line would be highly desirable to minimize the obtrusiveness of the fly line on the water, for example where low water levels are present and thus line presentation without substantial disturbance of fish is difficult at best.

SUMMARY OF THE INVENTION

This invention provides improved fishing lines (both primary lines and leader/butt, sections), and more particularly fly fishing lines, and methods of manufacture and making ready for use. Lines of this invention used for floating lines have a specific gravity of less than 1 without the necessity of the addition of microspheres or blowing agents, are plasticizer free (and thus more durable and less subject to cracking and hardening), and have sufficient mass, but without undue bulk, so that good casting characteristics are maintained. In one embodiment, the lines are substantially clear (i.e., transparent).

The lines include a core line portion and a coating over the core line including a copolymer of olefin and acrylic material, the coating material having a specific gravity of less than 1. The core line portion may be made of material having a specific gravity of greater than 1, with the overall line yet having a specific gravity of less than 1.

The olefin is preferably a ethylene, and, more particularly, the copolymer is preferably either ethylene ethyl acrylate copolymer used in association with a styrene butadiene polymer (for pigmented lines) or an ethylene acrylic acid copolymer used alone (for transparent lines). The core line portion may be any of nylon, polypropylene and polyester material (with nylon preferred for a transparent line), the material being multifilament (braided or yarn) or monofilament in form.

The method of making fishing line of this invention includes the steps of passing a core line of one of nylon, polypropylene and polyester material through a crosshead die, coating the core line while in the die with a polymeric material that is at an elevated temperature, and limiting exposure of the core line to the elevated temperature to less than two seconds before cooling of the coating occurs.

The method of readying such lines which include a braided core line for field use with a leader section attached includes the steps of stripping a section of the coating from the core line to expose a length of the braided core line, priming an end of the leader section with a glue, threading the end of the leader section through the center of the exposed braided core line, and saturating the exposed braided core line having the end of the leader section therein with the glue.

It is therefore an object of the invention to provide improved fishing lines and methods of manufacture and use.

It is another object of this invention to provide improved fly fishing lines and leaders.

It is still another object of this invention to provide a floating fly line which is substantially transparent.

It is yet another object of this invention to provide floating fly lines and leaders which utilize no microspheres or blowing agents and which are plasticizer free.

It is yet another object of this invention to provide a method of making fly lines using a crosshead dye.

It is yet another object of this invention to provide a method of making a leader fast to a fly line having a braided core by attaching the leader directly to the core.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is an illustrative view of the fly line of this invention shown in use;

FIG. 2 is an enlarged cross sectional view of the fly line of FIG. 1 taken along section line 2—2 thereof;

FIG. 3 is a diagrammatic illustration of the method of manufacture of this invention;

FIG. 4 is a sectional illustration of a die used in the method of FIG. 3; and

FIG. 5 is a sectional illustration of a method of this invention for affixing a leader section to a fly line of this invention having a braided core line.

DESCRIPTION OF THE INVENTION

Referring to the drawings, fly line 15 of this invention is shown in FIG. 1 in use in association with fly fishing rod 17 and reel 19 for casting lure, or fly, 21. Fly 21 is attached to line 15 using leader and/or butt section 23. The fly, leader, and line are all configured for floating on the surface of water 25.

As shown if FIGS. 2 and 5, line 15 includes core line portion 28 and coating portion 30. The core line portion may be made of any one of braided nylon multifilament fiber (FIG. 5), multifilament nylon yarn, monofilament nylon fiber (FIG. 2), or multifilament polypropylene and/or polyester materials (though nylon materials are preferred for application with the transparent fly line embodiment of this invention discussed hereinafter). The coating portion includes a copolymer of olefin (preferably ethylene) and acrylic (two of which copolymers are discussed herein below).

Coating 30, for more cold weather lines, is preferably a mixture of about 90 to 95% ethylene ethyl acrylate copolymer (for example, Union Carbide DPD 6169, DPD 9169 or a blend thereof depending on desired molecular weight) with about 5 to 10% styrene butadiene polymer (for example, Stereon 840A by Firestone Synthetic Rubber & Latex), the mixture ratios depending on the likely zones (from temperate to arctic and subarctic) of use of the line. Both polymers have a specific gravity of less than 1. Dry particle additives may be mixed with the polymer blend pellets as desired. Such additives may include pigments, metal powders (to provide sinking lines), lubricants and ultraviolet absorbers.

The clear, or transparent, floating fly line provided by this invention preferably uses a core line portion 28 of monofilament nylon fiber and a polymer coating portion 30 of ethylene acrylic acid copolymer, a clear polymer having a specific gravity of less than 1 (for example, Dow Chemical Primacor XU60751.15, XU60751.16 or blends thereof depending on desired molecular weight). The use of monofilament nylon and a copolymer of the same or sufficiently similar refractive index produces the substantially optically clear line. This line is also quite appropriate in warmer climates. Additives, as before, may be intermixed.

While the core material may have a specific gravity greater than 1, when coated, line 15 of this invention has a specific gravity of less than 1.

The same materials utilized in the clear floating line described above are use in the leader/butt section 23 of this invention. The butt section will normally be two to three feet in length. As an example, in order to provide a floating leader/butt section using a core line portion of nylon monofilament having a diameter of 0.018" with a specific gravity of 1.14, it is necessary to apply a coating of 0.96 specific gravity clear polymer such that the total leader/butt section diameter is no less than about 0.038". The butt section of the leader possesses the largest diameter, and may be attached, or tapered, to a lesser diameter which, although having a higher specific gravity, will float because of the surface tension of the water (i.e., total leader length may range from six to 12 feet and may be segmented or tapered down to a leader diameter of 0.005" or slightly less depending upon the sensitivity of the dry fly presentation).

Application of the polymer blend coating materials to the core line portion are illustrated in FIGS. 3 and 4 (it should be noted that the method of this invention as hereinafter described may be utilized with a wide range of materials, including coatings of PVC and other materials not specifically encompassed within the scope of the fly lines of this invention). Core line 28 is passed through crosshead die 33 of extruding unit 35. Feed of the polymer pellets to die 33 is supplied from hopper 37 by a single screw plastic extruder 39.

As the polymer mixture passes through the extruder and crosshead die extrudate temperatures can range as high as 400° F. depending on the material and the various zone temperature settings selected at control unit 41 for control of band heaters 43 and 45 (addition zones could be utilized if desired).

Die opening 47 typically ranges from 0.040" to 0.056" depending on the weight of line to be produced. Line tapers are achieved by varying the speed at which the core line passes through the die, for example by controlling the take up speed at reel 49 using motor 51. For example, a 0.052" die opening with a core line speed of about 15 feet per minute and a screw speed on the extruder of 13 RPM will produce line diameters up to about 0.080". By increasing line speed to about 40 feet per minute, line diameter drops to between about 0.048 to 0.052". Core line speeds may vary (and die opening sizes may be adjusted) as necessary to achieve a selected line diameter.

However, to accommodate the criticality of centering of core line 28 made of the materials adapted for this use, relative to die opening 47 (i.e., so that an even distribution of coating materials is achieved), it was found that the die had to be modified by moving guider tip 53 of mandrel 54 closer to outlet opening 55 of die holder 57 (to within about 0.060", this gap normally being in the range of about 0.200" for most better known operations).

The elevated temperature coating technique described herein limits exposure between the polymer coating and core line to less than two seconds, depending on the speed of line 28 through die 33, and preferably to less than one second in the case of a nylon core line, before cooling occurs at cooler (a water bath for example) 59. For example, tensile strength of nylon core material is detrimentally affected by extended high temperature exposure (+358° F.), and exhibits outgasing with extended exposure to temperatures over about 345° F., the result of which is undesired bubbles in, and thus a rough, coating. Other core line material are even more sensitive. It is thus imperative to overall line integrity that the sensitive core materials be exposed to the elevated temperatures necessary for smooth application of the coating materials for a very short time.

The method described herein does not use a primer to achieve a bond between the core and polymer coating as is required in many prior manufacturing techniques. This is so because no significant bond is required between core line portion 28 and coating portion 30, since line backings, leaders and the like are attached directly to core line portion 28. Although coating portion 30 is not bonded to the core, it provides a tough and flexible envelop around the core that is highly resistant to circumferential cracks.

For example, splicing of line backing to the fly line is achieved by peeling about 3" of coating from the core. A conventional blood knot may be used to accomplish the splice. A drop of cyanoacrylate super glue applied to the knot further enhances the splice.

In accord with another aspect of this invention, for splicing monofilament nylon leader to a line 15 having a braided core portion as shown in FIG. 5, approximately ½" of coating 30 is peeled from braided core 28. Leader/butt section 61 (which may be a conventional monofilament fiber or leader/butt section 23 as described hereinabove) is primed with a glue (for example, cyanoacrylate super glue) and then threaded through center 63 of braided core 28 such that it meets or exceeds a distance about equal to resumption of the coated portion 30 of line 15. The glue is then applied such that it saturates the exposed braided core 28 having leader/butt section 61 therein. When dry a solvent blend mixture of the same materials (for example, styrene butadiene polymer) used in coating 30 may be coated over the exposed braided core.

This splicing technique for leader to fly line may be further enhanced by adding a fluorescent pigment to the solvent mixture in order to provide a highly visible and floating indicator for the fly line. In addition, the splicing technique can be utilized for adding a sinking line section to a floating line when both line sections have a braided core. In this situation a 1" section of approximately 20 pound monofilament is used with ½" segments spliced onto each of the line segments in question following the procedure previously described.

What is claimed is:

1. A floating fly fishing line comprising:
    a core line portion of a first material; and
    a coating over said core line portion made of a second material different from said first material and including a copolymer of olefin and acrylic material and having a specific gravity of less than 1, said first and second materials having sufficiently similar indices of refraction selected so that the fly fishing line is substantially transparent absent addition of pigment to said first or second material.

2. The line of claim 1 wherein said core line portion is made of material having a specific gravity of greater than 1, wherein said line has a specific gravity of less than 1.

3. The line of claim 1 wherein said olefin is ethylene.

4. The line of claim 3 wherein said copolymer of ethylene and acrylic material is ethylene ethyl acrylate copolymer.

5. The line of claim 1 wherein said coating further includes a styrene butadiene polymer material.

6. The line of claim 1 wherein said copolymer is an ethylene acrylic acid copolymer.

7. A floating fishing line comprising:
    a core line made of material having a specific gravity grater than 1; and
    a coating over said core line including a copolymer of ethylene and acrylic material and having a specific gravity of less than 1, said coating of sufficient thickness over said core line to provide a finished fishing line having a specific gravity of less than 1.

8. The line of claim 7 wherein said fishing line is a leader section, and wherein said core line is monofilament nylon fiber and said copolymer is an ethylene acrylic acid copolymer.

9. The line of claim 7 wherein said fishing line is a substantially transparent floating fly line.

10. The line of claim 9 wherein said copolymer is an ethylene acrylic acid copolymer.

11. The line of claim 7 wherein said line is a pigmented fly fishing line, and wherein said copolymer is an ethylene ethyl acrylate copolymer, said coating further including a styrene butadiene polymer.

12. The line of claim 7 wherein said core line material is any of braided multifilament fiber material, multifilament yarn material and monofilament fiber material.

13. The line of claim 7 wherein said line is plasticizer free.

14. A floating fly fishing line comprising:
    a monofilament nylon core line portion having a specific gravity greater than 1; and
    a coating over said core line portion including a copolymer of olefin and an acrylic acid material and having a specific gravity of less than 1, said core line portion and said coating having sufficiently similar indices of refraction selected so that the floating fly fishing line is substantially transparent absent addition of pigments.

15. The fly fishing line of claim 14 wherein said olefin is ethylene.

16. The fly fishing line of claim 14 wherein said copolymer is ethylene acrylic acid.

17. The fly fishing line of claim 14 wherein said coating is unexpanded and free of either of microspheres and blowing agents.

* * * * *